(No Model.) 2 Sheets—Sheet 1.
J. A. EDWARDS & E. WALTON.
HAY OR STRAW STACKER.
No. 387,501. Patented Aug. 7, 1888.
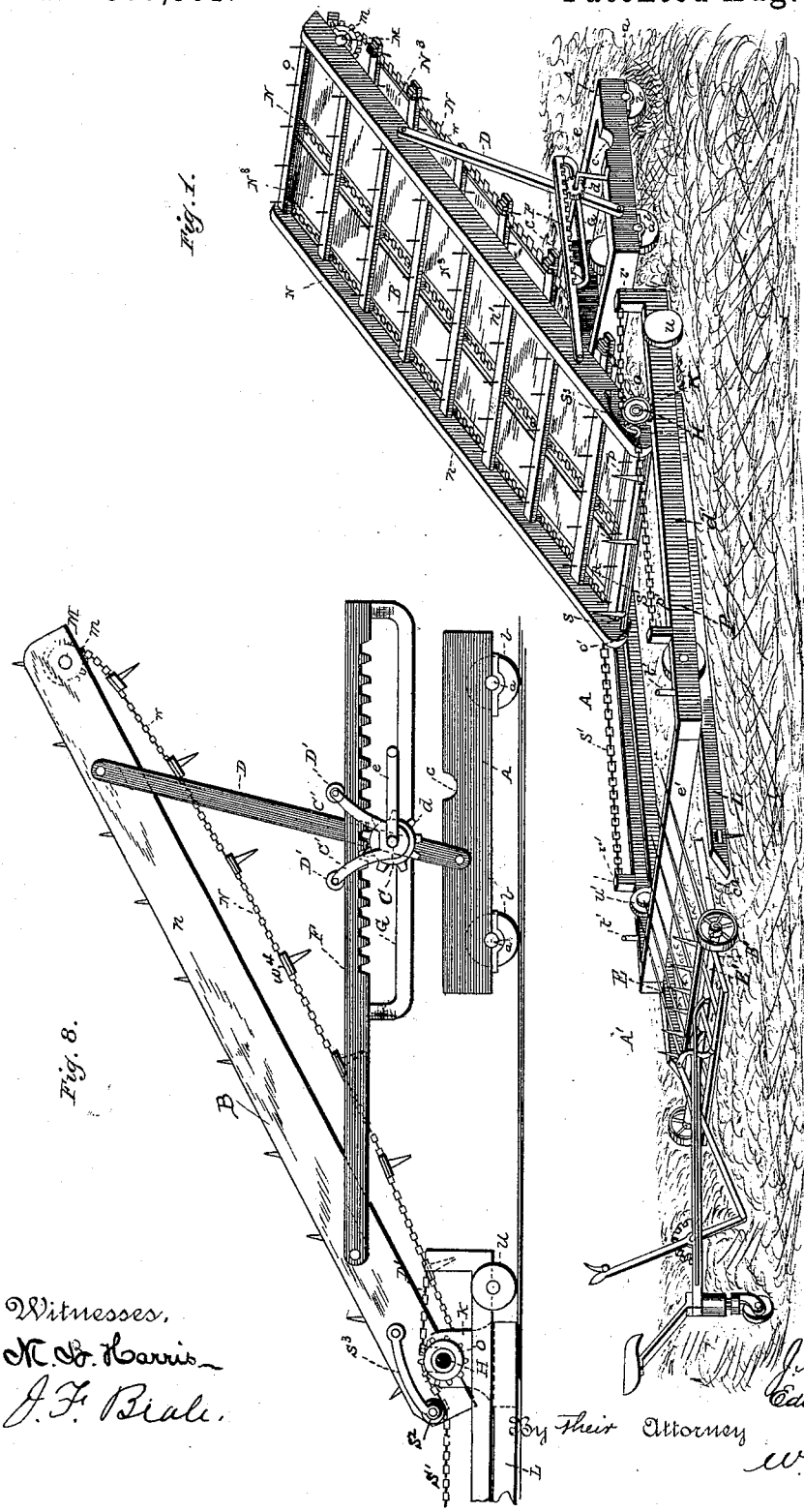
Witnesses.
M. B. Harris
J. F. Biali.
Inventor.
J. A. Edwards.
Edward Walton
By their Attorney
W. A. Redmond.

(No Model.) 2 Sheets—Sheet 2.
J. A. EDWARDS & E. WALTON.
HAY OR STRAW STACKER.
No. 387,501. Patented Aug. 7, 1888.
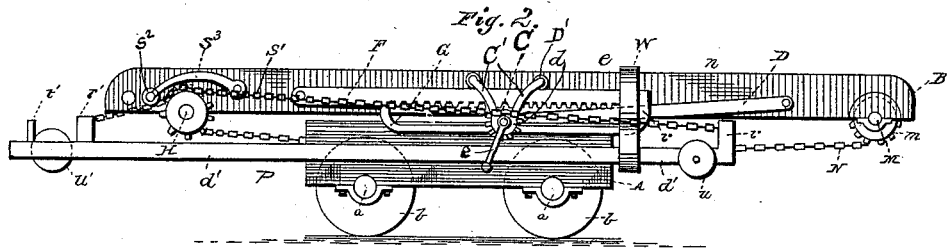
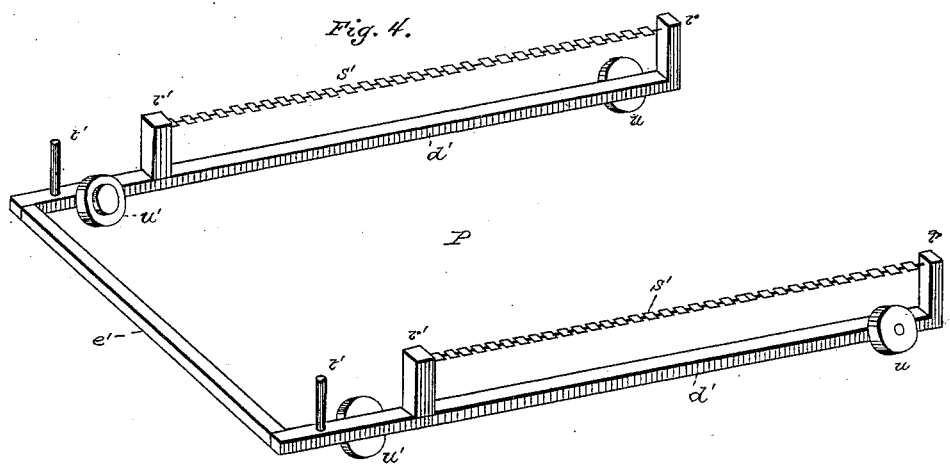
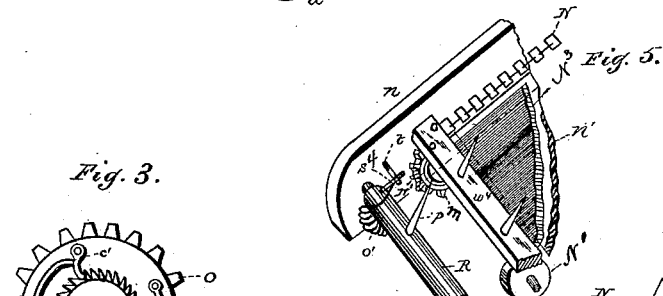
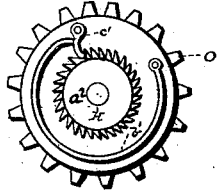
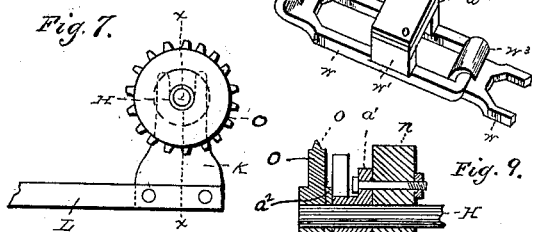
Witnesses.
N. B. Harris
J. F. Beale
Inventor,
J. A. Edwards.
Edward Walton.
By their Attorney
W. A. Redmond.

UNITED STATES PATENT OFFICE.

JOSEPH A. EDWARDS AND EDWARD WALTON, OF CHARITON, IOWA, ASSIGNORS OF ONE-THIRD TO DAVID WORMLEY, OF SAME PLACE.

HAY OR STRAW STACKER.

SPECIFICATION forming part of Letters Patent No. 387,501, dated August 7, 1888.

Application filed November 2, 1887. Serial No. 254,112. (No model.)

*To all whom it may concern:*

Be it known that we, JOSEPH A. EDWARDS and EDWARD WALTON, citizens of the United States, residing at Chariton, in the county of Lucas and State of Iowa, have invented certain new and useful Improvements in Hay or Straw Stackers; and we do hereby declare the following to be a full, clear, and exact description of the invention, such as will enable others skilled in the art to which it appertains to make and use the same.

This invention relates to that class of machines for elevating hay or straw for deposit in barns, barracks, &c., or on stacks or wagons, which take the hay directly from the rake or drag by which it is gathered; and it has for its object to provide a machine of few parts, which will be easily operated and comparatively inexpensive, and which may be operated by the rake or drag which gathers the hay and which can be readily adjusted to any desired angle of inclination and folded for transportation to different parts of a field as its services are needed; and it consists in the parts and combinations of parts hereinafter described and claimed.

In the accompanying drawings, forming a part of this specification, Figure 1 is a perspective view of our improved machine and the drag or rake for operating the same ready for operation; Fig. 2, a side view of the machine folded ready for transportation; Fig. 3, a detail view of the belt-operating device or clutch-hub; Fig. 4, a perspective view of the power carriage or beams; Fig. 5, a detail view of the lower end of the straw-carrier; Fig. 6, a detail view of one of the links of the sprocket-chain and the device for fastening the slats to said sprocket-chains; Fig. 7, a detail view of one of the bearings for the straw-carrier; Fig. 8, an enlarged side elevation of the stacker; and Fig. 9, a sectional detail view on the line $x\ x$, Fig. 7.

Similar letters refer to similar parts throughout the several views.

Although we have represented in the drawings our improved drag or rake for gathering the hay and operating the stacker, its construction will only be described in so far as it is necessary to show its relation to the stacker as one means of operating the same, as we have filed another application for Letters Patent therefor of even date herewith, Serial No. 254,113.

Proceeding now to the description of the stacker, A represents the truck for supporting the straw-carrier B, and on which it may be folded when it is desired to transport the same. It consists simply of a rectangular frame or box, having bearings $a$ on its lower side or edge for the axles of the wheels $b$, the latter being located within the frame. At suitable points on the upper edge of the truck A semicircular depressions $c$ are formed, in which the shaft C rests when the straw-carrier B is folded on the truck for storage or transportation, thereby preventing the longitudinal movement or displacement of the straw-carrier. Bars D are pivoted at one end to the sides of the truck A and their other or upper ends to the side pieces, $n$, of the frame of the straw-carrier, near the upper or discharge end of the same.

At a suitable point on the bars D bearings are formed for the cross-shaft C, on each end of which a pinion, $d$, and a crank-handle, $e$, are secured. To the side pieces, $n$, of the carrier-frame, near their lower ends on each side, are pivoted the rack-bars F. These bars extend rearwardly or toward the discharge end of the stacker, and have formed integral therewith or secured thereto the guides or guards G, which hold the toothed or rack bars in mesh with the pinion $d$.

As will be noticed, the guards or guides G are not immediately beneath or in line with the toothed or rack bars, but are to one side thereof, and, also, that the ends are bent or turned up to join the bars, said ends being connected to the sides of the bars, so as to leave a space between their upper edges and the teeth of the rack-bar, so that the bars may run or be moved back and forth on the pinion $d$. This construction of the bars F enables them to be used as guides for the pinions $d$, as the sides of the lower halves of the latter will at all times bear against the outer sides of the guides or guards G, and thus they cannot get out of mesh with the teeth of the rack-bars.

In Figs. 2 and 8 we show a modification of the means for holding the pinions $d$ in mesh with the teeth of the rack-bars F. In these views will be seen two bent arms, C', which are attached in any suitable manner to the ends of the shaft C and carry on their free ends friction-wheels D', which bear on the upper surface of the toothed or rack bars F, to hold the pinions d in mesh with the teeth of said bars, and which, when the carrier is being elevated or lowered, run along the upper surfaces of said bars, as on a track. For the purpose of more clearly showing the construction and arrangements of these parts, the guides G and bent arms C' are both shown in Fig. 8; but it will be understood that where one is used the other will be unnecessary.

At the foot of the carrier-frame a shaft, H, is journaled and extends outwardly on both sides beyond said frame and projects or passes through hollow trunnions a', secured to the outer sides of said frame. Said trunnions, having their bearings in the upper ends of the uprights or supports K, as shown in Figs. 7 and 9, may turn easily on said supports when the carrier-frame is elevated and lowered. The uprights K are bolted or otherwise rigidly secured to one end of the track L, the rails of which are sloped or tapered off at their outer ends to form an incline. The track is firmly but removably secured to the earth by means of stakes driven through clevises formed on or secured to the sides of the rails. A shaft, M, is journaled in bearings formed on the lower edges of the upper end of the carrier-frame, and both this shaft and shaft H carry near their ends inside the frame of the carrier sprocket-wheels m, around which pass the sprocket-chains N of the endless toothed carrier, which carries or elevates the straw or hay, and a suitable number of pulleys, N', are secured to both shafts between their ends to support the belts N³ of the toothed carrier. On both ends of shaft H, outside of the upright bearings K, sprocket-wheels O are secured by means of any suitable clutch-hub, which will cause the rotation of the shaft when the sprocket-wheels are turned in one direction and permit the sprocket-wheels to run free or loose when turned in the opposite direction. We have shown one form of this clutch in Fig. 3, in which $a^2$ is a ratchet-wheel rigidly secured to the shaft H outside of the frame of the carrier near the ends of said shaft, and b' is a spring having one end secured to the inner side of the sprocket-wheel O and its other or free end pressing against a pawl, c', loosely pivoted to the side of the sprocket O and engaging with the ratchets $a^2$, so that when the sprocket-wheels are turned in one direction the springs will hold the pawls in engagement with the ratchets and shaft H, and cause the said ratchets and shaft to rotate with the sprocket-wheels, while, when turning in the other or opposite direction, the pawls will slip over the ratchets and the sprocket-wheels run loose on the shaft.

P represents the power-carriage for operating the endless carrier. This consists of two long beams, d', connected at one end by a cross-beam, e', the other ends of the long beams being provided with projecting uprights r, to each of which one end of spocket-chains s' are secured, the other ends of the chains being secured to projecting uprights r' near the opposite ends of the beams. Short pins t' also project from the ends of the beams immediately in front of the uprights r'. At the unconnected ends of the beams wheels u are journaled, and flanged wheels u' are journaled at the opposite end for the purpose of supporting the power-carriage.

The wheels u are somewhat larger in diameter than the wheels u', and are journaled on the outside of the beams d', while the wheels u' are journaled on the inner side of the same beams. The flanged wheels u' run on the track, while, as clearly shown in Fig. 1, the wheels u run on the ground alongside of the carrier and in the rear of said track. The object of tapering the ends of the rails of the track is to permit the flanged wheels to easily run on or off the same, as well as to permit the engagement and disengagement of the axle E' of the rake E with said power-carriage, as will be explained more fully hereinafter.

The sprocket-chains s' run on the sprocket-wheels O of shaft H, and are held in contact therewith by friction-pulleys $s^2$, secured on the ends of springs $s^3$, one end of the latter being secured to the end of the carrier-frame, so that the springs exert their pressure directly on the chains s' through the pulleys.

The carrier-frame consists of the two side pieces n, which stand high enough above the bottom n' to permit of the endless carrier running easily over the same between the side pieces. At the lower or receiving end of the carrier a bar, R, having projecting teeth p, is journaled and at one end of this bar a short tooth, $s^4$, projects at right angles, and is held in contact normally with a stop, t, projecting laterally from the inner side of one of the side pieces n, by a spring, o', which is secured at one end to any suitable point on the carrier-frame, and at its other end to the tooth $s^4$ or the bar R, in such manner as to hold the tooth in contact with the under side of the stop t, until the teeth p and bar R are forced inward, as will be explained hereinafter. (See Fig. 5.)

The rake E is provided with an axle, E', carrying the wheels and adjustable shafts $C^2$, the latter being adjustable in the sense that they are secured to the axle by collars, so that they may follow the motion of the horses in passing over rough or uneven ground. A beam extends rearwardly from the axle and is supported by a caster-wheel. On a seat attached to this beam the driver sits and operates the lever to raise or lower the rake-teeth. The axle of the rake is somewhat longer than the rake is wide.

The sprocket-chains N of the endless carrier are formed of bridged links w—that is, links having side pieces w' and cross-pieces $w^2$ high enough to permit the teeth of the sprocket-wheels m to catch into the links as they pass over said wheels, one end of said links being formed with a hook, $w^3$, to catch on the next link to form the chain. The toothed slats $w^4$ of the carrier are bolted or secured in any other desired manner to the cross-pieces $w^2$, as shown in Fig. 6.

The operation is as follows: The machine and track being in position, the endless carrier and frame are elevated the desired height by means of the crank $e$, which, on being turned in the proper direction, causes the pinions $d$ to travel along the rack-bars F, thus running or moving the truck outwardly or away from the machine and raising or straightening the bars D and elevating the rear or discharge end of the carrier-frame, the hollow trunnions $a'$ at the lower end of the latter turning in their bearings in the supports K until the carrier-frame is raised the desired height. The sprocket-chains $s'$ of the power-carriage are fitted over the sprocket-wheels O, the ends of the beams $d'$ of said carriage extending just beyond the inner end of the track at the foot of the carrier and the wheels $u$ on the ground, while the outer flanged wheels, $u'$, are also on the ground just in front of the inclined ends of the rails and in line therewith, thus leaving the power-carriage at its outer end lower than its inner end, owing to the difference in diameter of the two sets of wheels $u$ $u'$. The rake, loaded with hay or straw, is now driven up, the horses being attached to the same at the outer sides of the shafts to the power-carriage, the horses passing one on each side thereof until the axle of the rake passes over the pins $t'$ and strikes against the uprights $r'$, thus pushing the carriage before it and the flanged wheels up the inclines onto the rails. As the power-beams are forced along, the sprocket-chains cause the sprocket-wheels O to rotate, and thus, through the clutch-hub, rotate shaft H and the endless carrier. At the same time the advancing rake is adjusted at an incline to permit the teeth of the endless carrier to pass over the bar R, and bringing the axle of the rake up against the same, thus depositing the hay on the lower end of the endless carrier, where it is retained by the toothed bar R. The horses are now backed and the rake backed out, its axle catching against the pins $t'$ to withdraw the power-carriage, but not rotating the endless carrier, as the clutch-hub will permit the sprocket-wheels O to turn loose or free on shaft H until the inclined ends of the rails are reached, where the flanged wheels drop off the track and liberate the axle of the rake from the pins $t'$. Thus it will be seen that as one load of hay is being deposited on the lower end of the machine the endless carrier is discharging the load already on it. This operation is repeated as long as the machines are in operation, one load being deposited on the stack or in the barn as another load is being deposited on the endless carrier. When necessary to move the stacker, it is folded on the truck by simply turning the crank $e$, and the power-carriage suspended from the same by the hook W. The rake may be employed to move the stacker by simply connecting the axle of the same to the stacker by chains or otherwise.

Having thus described our invention, what we claim as new, and desire to secure by Letters Patent, is—

1. The combination, in a portable and folding hay-stacker, of the truck A, the bars D, pivoted to said truck and to the carrier-frame B, the shaft C, having bearings on said bars and provided with the pinions $d$ and crank-handles $e$, the carrier-frame B, pivotally supported at one end, the toothed or rack bars F, pivotally secured at one end to said carrier-frame and having the guards or guides G, the endless carrier, and means for operating the same, substantially as described.

2. The combination, in a portable and folding hay-stacker, of the truck A, the bars D, pivoted to said truck and to the carrier-frame B, the shaft C, having bearings on said bars and provided with pinions $d$ and cranks $e$, the toothed bars F, pivoted to the carrier-frame B and having the guides or guards G, the carrier-frame B, the shafts H M, having bearings on said carrier-frame, the sprocket-wheels $m$, the endless carrier, the upright supports K, sprocket-wheels O, and means for operating the same, substantially as described.

3. The combination, in a hay-stacker, of the carrier-frame, the shafts H and M, journaled at its upper and lower ends, the sprocket-wheels secured on said shafts within the frame, the endless carrier running on said wheels, the hollow trunnions secured to said frame, the upright supports for said trunnions, the sprocket-wheels O, loosely mounted on said shaft H, the spring-clutch connection between said wheels and shaft, and means for operating said sprocket-wheels, substantially as described.

4. The combination, with a portable hay-stacker, of the carrier-frame B, pivotally and adjustably supported, the shaft H, the sprocket-wheels O, the spring having one end secured to said sprocket-wheels, the pawls loosely pivoted to said wheels, the ratchet-wheel rigidly secured to the shaft H, and the power-carriage carrying sprocket-chains, said chains engaging said sprocket-wheels and adapted to operate the endless carrier, substantially as described.

5. The combination, in a portable and folding hay-stacker, of the truck A, having the depressions $c$, the bars pivoted to said truck and to the carrier-frame, the shaft journaled on said bars and having the pinions $d$, the carrier-frame B, and the pivoted toothed or rack bars F, having guides or guards G, rigidly secured thereto, whereby said carrier-frame may be folded and its longitudinal movement on said truck prevented, substantially as described.

6. A power-carriage for hay-stackers, consisting of the longitudinal beams $d'$, having the uprights $r$ and $r'$ at opposite ends, the pins $t'$, the sprocket-chains $s'$, the cross-beams $e'$, the wheels $u$, and flanged wheels $u'$, in combination with the carrier-frame having the driving sprocket-wheels, substantially as described.

7. An endless carrier for hay-stackers, consisting of the side pieces $n$ and bottom $n'$, shafts H M, the sprocket-wheels $m$, the sprocket-chains N, formed of the bridged links $w$, having side pieces $w'$, cross-pieces $w^2$ and hook $w^3$, and the toothed slats $w^4$, secured to said cross-pieces $w^2$, substantially as described.

8. The hereinbefore-described hay-stacker, consisting of the truck A, the bars D, pivoted to said truck and the carrier-frame B, the shaft C, journaled on said bars and having the pinions $d$ and cranks $c$, the toothed bars F, pivoted to the carrier-frame and having the guides or guards G, the carrier-frame B, the shaft H M, carrying the sprocket-wheels $m$, the endless carriers, the sprocket-chains N, the toothed bar R, the sprocket-wheels O, clutch hub or connection between the sprocket-wheels O and the shaft H, the hollow trunnions $a'$, uprights K, the power-carriage P, the track having inclined ends, and means for operating the power-carriage, substantially as described.

9. The combination, in a hay-stacker, with an adjustable frame carrying endless carriers, of a wheeled truck, bars pivoted to said truck and to the discharge end of the apron, a cross-shaft journaled to said bars and having pinions and cranks, and toothed or rack bars pivoted at one end to the carrier-frame and supported by the cross-shaft at their other end, substantially as described.

In testimony whereof we affix our signatures in presence of two witnesses.

J. A. EDWARDS.
EDWARD WALTON.

Witnesses:
N. B. GARDNER,
S. D. HICKMAN.